United States Patent [19]
Brown

[11] Patent Number: 5,997,163
[45] Date of Patent: Dec. 7, 1999

[54] MOBILE LASER SPOTLIGHT SYSTEM FOR LAW ENFORCEMENT

[75] Inventor: David C. Brown, Brackney, Pa.

[73] Assignee: L E Systems Inc., Glastonbury, Conn.

[21] Appl. No.: 09/093,692

[22] Filed: Jun. 9, 1998

[51] Int. Cl.[6] .............................. F21V 8/00; B60Q 1/26
[52] U.S. Cl. .................... 362/553; 362/544; 362/511; 362/259; 362/547; 362/583; 362/580; 362/542
[58] Field of Search ........................... 362/583, 558, 362/580, 553, 511, 546, 547, 543, 544, 259, 293, 510, 294, 373, 542

[56] References Cited

U.S. PATENT DOCUMENTS

| | | | |
|---|---|---|---|
| 4,744,615 | 5/1988 | Fan et al. | 362/259 |
| 5,606,634 | 2/1997 | LeBihan | 362/259 |
| 5,713,654 | 2/1998 | Scifres | 362/553 |
| 5,857,770 | 1/1999 | Fohl et al. | 362/553 |
| 5,890,796 | 4/1999 | Marinelli et al. | 362/511 |
| 5,918,973 | 7/1999 | Nojiri | 362/511 |

FOREIGN PATENT DOCUMENTS

| | | | |
|---|---|---|---|
| 354110530 | 8/1979 | Japan | 362/511 |

*Primary Examiner*—Thomas M. Sember
*Attorney, Agent, or Firm*—Alix, Yale & Ristas, LLP

[57] ABSTRACT

A vehicle mounted laser spotlight system employs a coherent/incoherent spotlight as a light source to produce an eyesafe light dispersion pattern to illuminate an ambient environment. The laser spotlight system includes an integrated laser unit having an integrated laser, power supply and control unit for selectively transmitting coherent light. A fiber optic cable optically couples the laser unit to a spotlight which receives the coherent light from the laser and transmits a beam of coherent light into the ambient environment. An incoherent light transmitter selectively transmits a beam of incoherent light coincident with the beam of coherent light. A converter module may be disposed intermediate the laser and the spotlight to convert the frequency and wavelength of the coherent light.

28 Claims, 8 Drawing Sheets

MOBILE LASER SPOTLIGHT SYSTEM FOR LAW ENFORCEMENT

BACKGROUND OF THE INVENTION

1. Field of the Invention

The present invention generally relates to the field of illumination devices for illuminating an ambient environment. More specifically, the present invention is directed to a laser spotlight system which illuminates an ambient environment while minimizing the risk of causing irreversible eye damage when gazed upon. Accordingly, the general objects of the present invention are to provide novel and improved methods and apparatus of such character.

2. Description of the Related Art

Law enforcement vehicles have had spotlights for many years. Such spotlights are used for a wide variety of functions, including searching. Searching can be the simple identification of house numbers at night while responding to a call for assistance, or can be a search for an individual or individuals under low light or nighttime conditions. Helicopter spotlights are commonly used to track individuals or vehicles fleeing from law enforcement under nighttime conditions. Once located, spotlights also provide the illumination needed to identify individuals or vehicles under low light or nighttime conditions. Spotlights are most effective on mobile ground vehicles because of the higher intensity available. Helicopters provide a wider area coverage, but the illumination intensity is significantly reduced because of the longer distances involved. Spotlights are also often used to provide low light level or nighttime illumination of crime scenes, accidents, or the routine checking of vehicles pulled over by law enforcement officials.

Conventional spotlights produce a beam that is easily directed without moving the vehicle and is relatively bright when compared to the beam produced by a flashlight. However, the power of such standard spotlights is limited and therefore the intensity and range of the light produced is limited. This limitation is especially significant when using the spotlight to disorient and confuse suspects since the amount of light that is perceived by the suspect must be relatively high to produce the desired effect.

Improvements to the spotlight have been made through the incorporation of modern high brightness sources, such as halogen lamps, or by more sophisticated reflector designs. However, the brightness of conventional incoherent light sources is limited. Such light sources may be collimated to obtain high intensity on target only over very short distances. By comparison, modern laser sources offer orders of magnitude more brightness at a given range.

Some inroads have been made in applying laser technology to portable illumination devices in limited areas. For example, laser guns are used to play laser tag, a recreational paramilitary game utilizing low-power laser guns as mock weapons. Additionally, low-power laser penlights have become commercially available. Such penlights utilize small semi-conductor red-diode lasers or diode-pumped green lasers powered by batteries to produce a very fine beam to be used as a pointer during presentations, etc. One major drawback of such uses of lasers has been that the laser beam emitted by such low-power devices has the potential to produce irreversible eye damage if a person gazes directly into the light source. Thus, these devices are not "eyesafe." Naturally, this problem will become exacerbated as attempts are made to increase the output power of such devices. Another significant limitation associated with such portable laser emitting devices is that they have, to date, been unable to produce nearly as much light as comparably sized incandescent lights. Accordingly, their lack of versatility and overall poor performance has limited their use to highly specialized areas such as those described above.

SUMMARY OF THE INVENTION

Briefly stated, the invention in a preferred form is a vehicle mounted laser spotlight system which employs a coherent/incoherent spotlight as a laser emitting light source to produce an eyesafe light dispersion pattern to illuminate an ambient environment. The laser spotlight system comprises an integrated laser unit for selectively transmitting coherent light including a integrated laser, power supply and control unit. A fiber optic cable optically couples the laser unit to a spotlight which receives the coherent light from the laser and transmits a beam of coherent light into the ambient environment. An incoherent light transmitter selectively transmits a beam of incoherent light coincident with the beam of coherent light.

In a preferred embodiment, the spotlight includes a housing defining an optical axis. The housing has an optically transmissive cover disposed on the axis. A source of incoherent light is disposed within the housing. The interior reflective surface of the housing at least partially collimates the incoherent light, forms the beam of incoherent light, and directs the beam of incoherent light along the optical axis. An end of the fiber optic cable is disposed within housing. At least one collimating lens is disposed on the optical axis intermediate the cover and the end of the fiber optic cable. The collimating lens receive and expanding the coherent light. A prism is disposed on the optical axis intermediate the collimating lens and the cover. The prism forms the beam of coherent light and directs the beam of coherent light through the cover along the optical axis of the spotlight.

It is, accordingly, an object of the present invention to provide an eyesafe laser spotlight system which will not produce irreversible eye damage if a person gazes directly into the spotlight.

It is a further object of the present invention to provide a laser spotlight system which can incorporated into a standard incandescent spotlight used on law enforcement vehicles.

It is still another object of the present invention to provide a vehicle mounted laser spotlight system which is capable of emitting significantly more light than prior laser-based illumination devices to thereby enable the laser spotlight to be effectively used over longer distances and/or to illuminate larger areas.

It is yet another object of the present invention to provide a vehicle mounted laser spotlight system having at least one laser emitter that can be modulated in either periodic or random fashion.

It is still another object of the present invention to provide a vehicle mounted laser spotlight system which provides an optimal combination of (1) simplicity; (2) reliability; (3) durability; (4) versatility; and (5) efficiency.

Numerous other advantages and features of the present invention will become apparent from the specification and the accompanying drawings.

BRIEF DESCRIPTION OF THE DRAWINGS

The preferred embodiments of the present invention will be described below with reference to the accompanying Figures wherein like numerals represent like structures and wherein.

DESCRIPTION OF THE PREFERRED EMBODIMENTS

Figure 1:
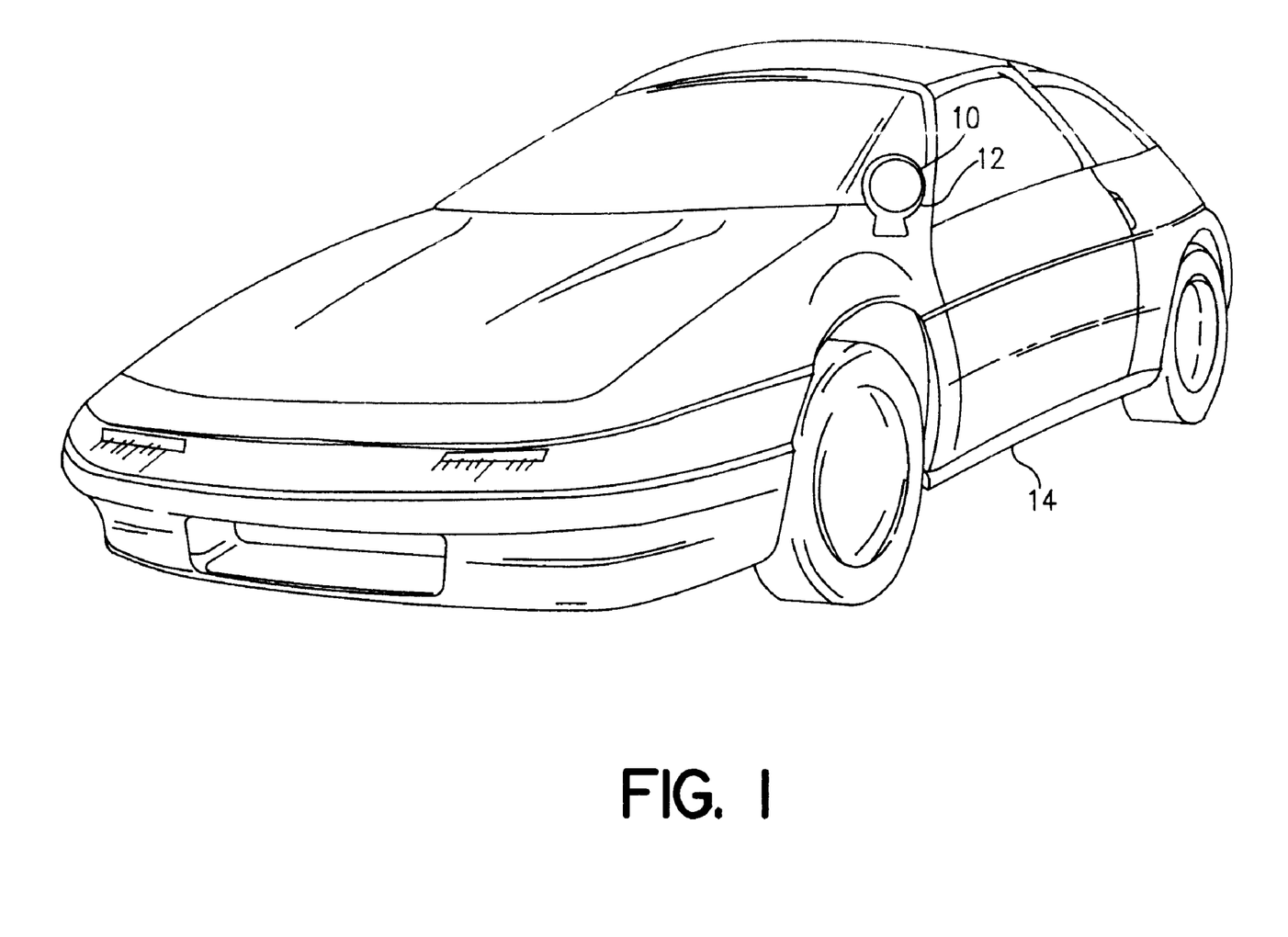
FIG. 1 is a front perspective view of a vehicle having a laser spotlight system of the present invention.

With reference to FIG. 1, a laser spotlight system 10 in accordance with the present invention includes a spotlight 12 which in one preferred embodiment is mounted to a mobile law enforcement vehicle 14, for example a boat, a helicopter or the door-post of an automobile. In a preferred embodiment, the spotlight system 10 combines the classical incoherent light source of conventional spotlights and a laser source together. The combined spotlight 12 offers the user a device that functions exactly the same way that a traditional spotlight does, but which offers much more flexibility. The coherent and incoherent sources can be used individually, or together. If close-in searching, identification, or illumination tasks are needed, the user may use the traditional incoherent source only. For tasks that are located a significant distance away, or for crowd control or locating individuals, the coherent laser source can be used. In some situations, the laser may be used together with the incoherent source to provide intense illumination or to create an "optical wall" of light to protect individual officers or other personnel in situations involving crowds or dangerous individuals.

Figure 2:
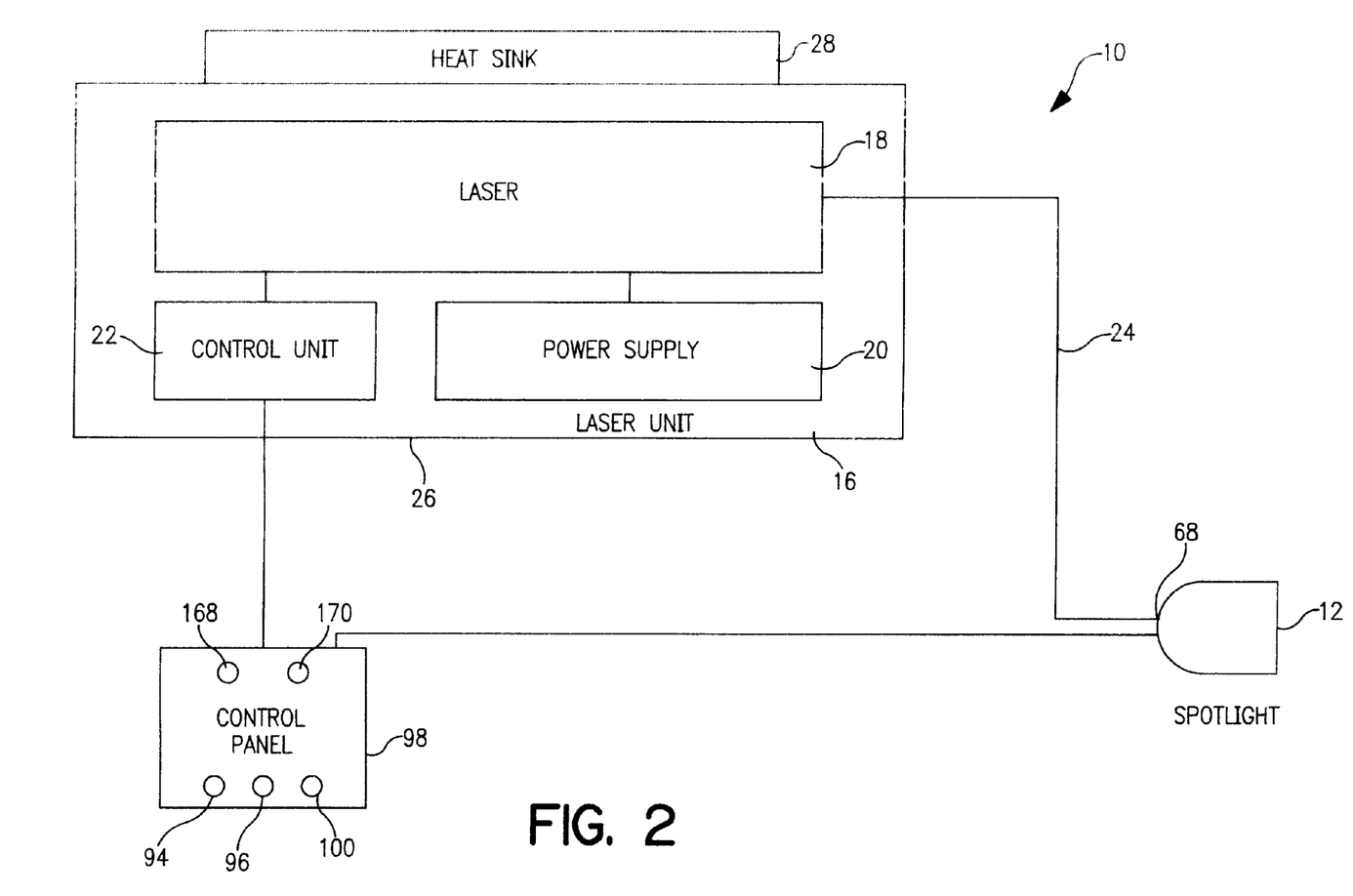
FIG. 2 is a schematic view of a first embodiment of the laser spotlight system of FIG. 1.

With further reference to FIG. 2, the spotlight system 10 includes a laser unit 16 comprising an integrated laser 18, power supply 20, and control unit 22. The entire laser unit 16 is mounted in a location remote from the spotlight 12, for example in the automobile trunk or under a seat, and an optical fiber cable 24 running from the laser unit 16 to the spotlight 12 provides a light path for the transmission of the laser light. A sealed enclosure 26 surrounds the laser 18, power supply 20 and control unit 22 to protect the electronic components from degradation due to moisture and airborne contaminants. Heat generated by the electronic components is removed by one or more heatsinks 28 mounted to the exterior of the enclosure 26. The laser unit 16 may also incorporate fans to provide forced convective cooling, or may be cooled by circulating a fluid.

The power supply 20 is connected to the electrical system of the vehicle, for example to the twelve volt electrical system of an automobile. The power supply 20 is sized to provide power to the laser emitting diode, the control unit 22, and the thermal energy cooler (TEC) unit used to cool the diode. To modulate the production of laser beams by the diode and to regulate the thermal energy cooler, the control unit 22 can include microprocessor controlled electronics as desired. The control unit electronics can be used to either periodically or randomly interrupt the flow of electricity from the power supply 20 to the diode package. While the diode is preferably supplied electricity from the power supply 20 on a continuous basis when laser spotlight system 10 is in an "on" condition, the diode could be pulsed at appropriate rates as desired to reduce power consumption and/or produce pulsating effects as desired. The control unit electronics will be capable of periodically pulsing electricity to the diode at a pre-determined rate to create a strobe-like effect.

Figure 3:
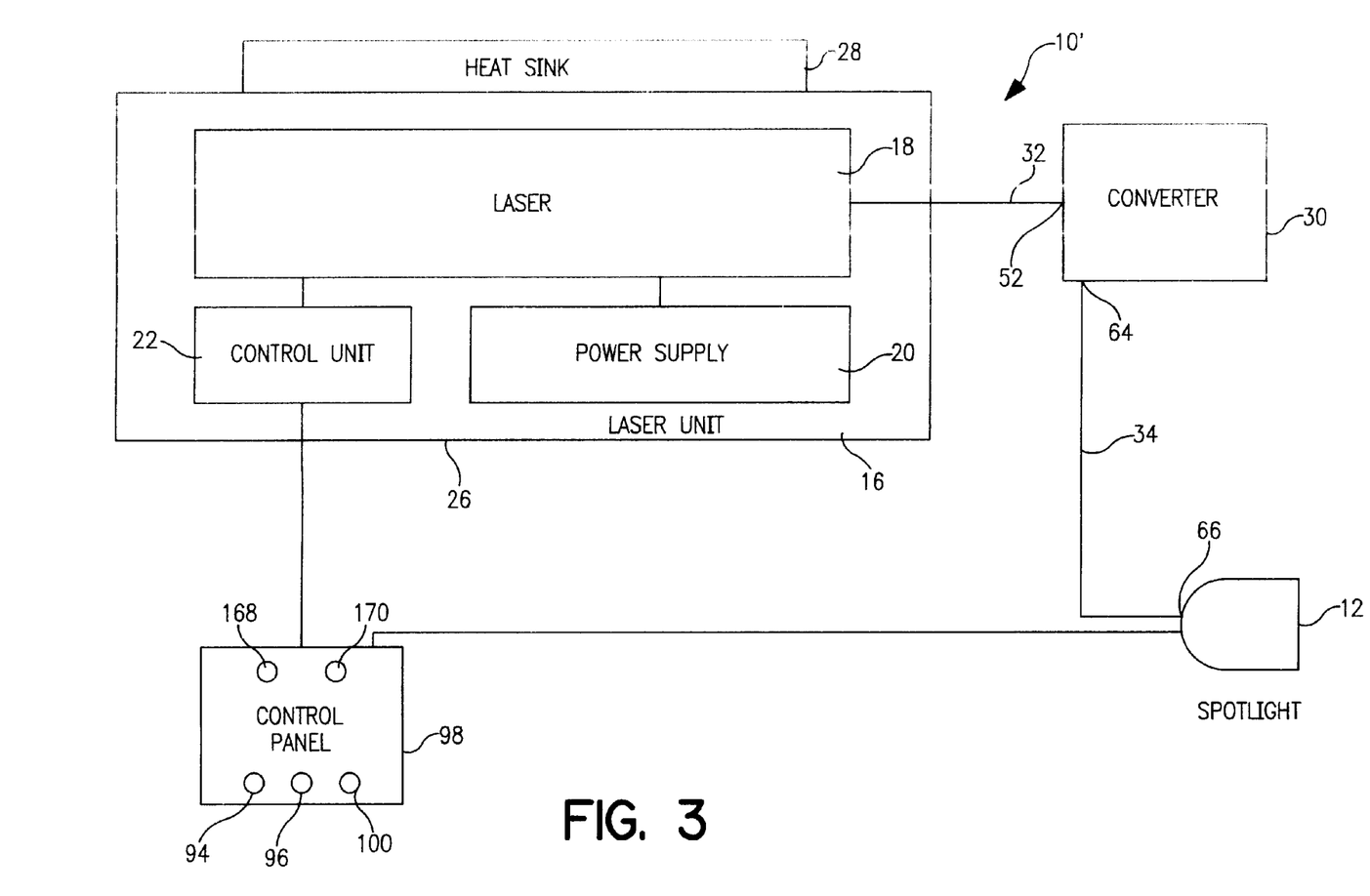
FIG. 3 is a schematic view of a second embodiment of the laser spotlight system of FIG. 1.
Figure 4:
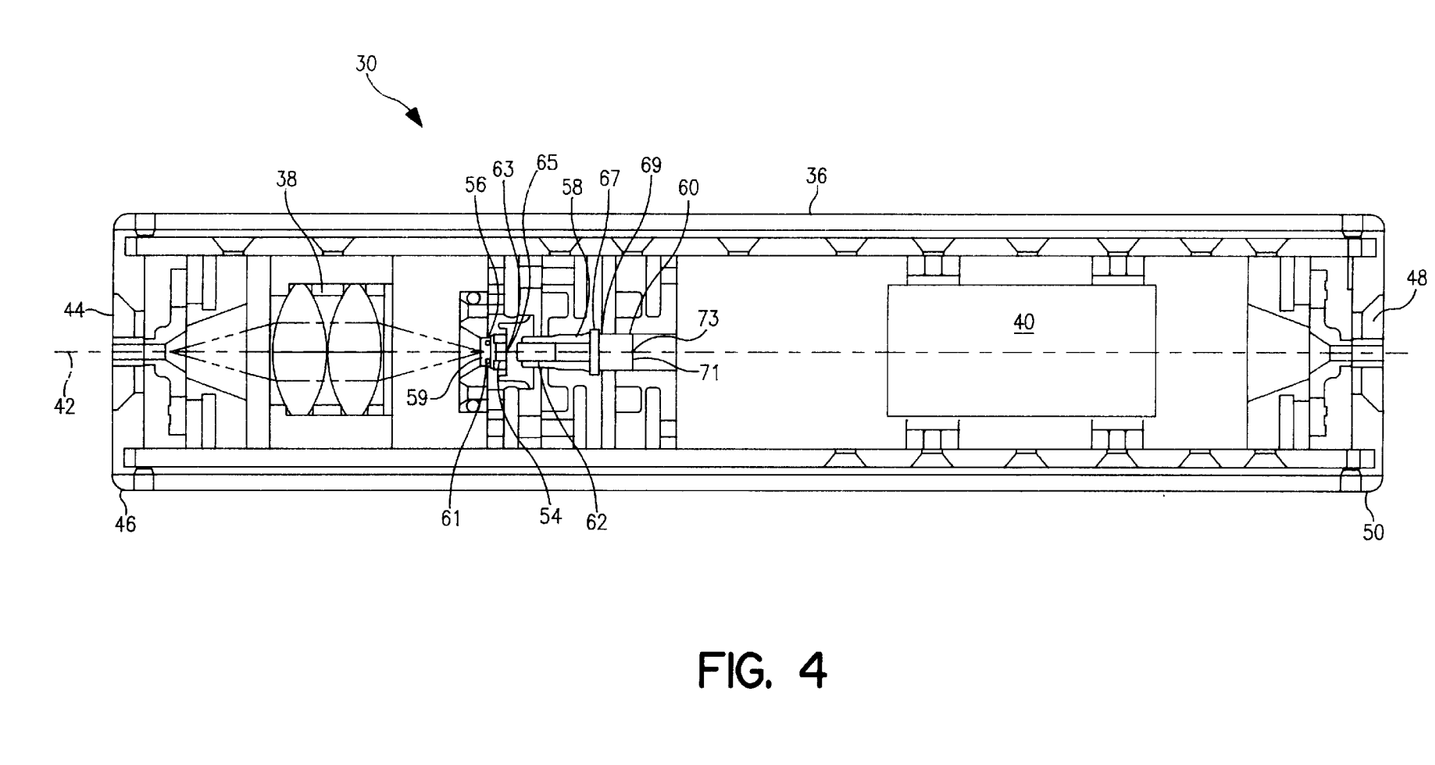
FIG. 4 is a cross-sectional elevation view of the converter module of FIG. 2.

With reference to FIGS. 3 and 4, the spotlight system 10' may also include a converter module 30 to convert the frequency/wavelength of the laser light. In this embodiment, a 532 nm converter module 30 is used to convert the laser light emitted by a 808 nm diode-pumped solid-state laser to green light. A first fiber optic cable 32 provides a light path for the transmission of a 808 nm laser beam from the laser unit 16 to the converter module 30 and a second fiber optic cable 34 provides a light path for the transmission of a 532 nm laser beam from the converter module 30 to the spotlight 12. The converter module 30 may be separate from the laser unit 16, as shown in FIG. 4. The separate converter module 30 may be mounted remotely in the same location as the laser unit 16. Alternatively, the integrated laser unit may include a converter module (not shown).

The converter module 30 includes a housing 36, resonator focusing elements 38, 40 and a closed cycle cooler (not shown). As shown in FIG. 4, these components are preferably axially aligned along an axis 42 which is defined by the direction of travel of laser beams received from the laser unit 16. The housing 36 comprises a generally cylindrical main body, an optical fiber input coupling 44 mounted at a first end 46 of the housing 36, and an optical fiber output coupling 48 mounted at a second end 50 of the housing 36. The housing main body and the optical fiber receptacles of the optical fiber input and output couplings 44, 48 are coaxial with axis 42. The second end 52 of the first optical fiber cable 32 is mounted within the optical fiber receptacle of the optical fiber input coupling 44 to optically couple the laser unit 16 with the converter module 30. The closed cycle cooler removes excess heat generated within the converter module 30.

Laser beams exiting the second end 52 of the first optical fiber cable 32 are received by the focusing lenses 38. The resonator preferably includes a Nd:YVO$_4$ (vanadate) crystal 54 to shift the wavelength of the light exiting the diode to 1064 nm and the outcoupler 60. A sapphire plate 56 is in contact with the vanadate crystal 54 to "draw" the heat out of the crystal 54 and spread it out. Ultimately the heat is conducted to a copper heat sink onto which the sapphire 56 is mounted. Longitudinal heat conduction is far preferable to radial since the heat is removed predominantly in the direction of the optical axis 42, and does not affect beam propagation. The crystal 54 temperature is minimized in this configuration, and the insulting crystal surface deformations are dramatically reduced when compared to the case of radial cooling, resulting in a resonator that will be very insensitive to power level.

The light exiting the vanadate crystal 54 preferably passes through a second harmonic generating (SHG) crystal 58 to produce the green colored output of 532 nm. In a standing wave resonator, the light is generated in two (opposite)

directions. To completely utilize the generated light, the light traveling backwards toward the vanadate crystal 54 must be turned around and made to co-propagate in phase with the light traveling toward the outcoupler 60. A "green trapping mirror" 62 has been placed between the vanadate crystal 54 and the SHG crystal 58 to maximize transmission at 1064 nm while simultaneously reflecting greater than 95% of the light traveling backwards toward the vanadate crystal 54. Preferably, the green light trapping mirror 62 is placed adjacent the vanadate crystal 54. Alternatively, one may place a coating 59 having a highly-reflective (HR) material at 532 nm on the vanadate crystal 54 itself, preferably on the rear surface 61 facing the focusing lenses 38. The rear surface 61 must be highly reflective at both 1064 and 532 nm, while also being highly-transmissive (HT) at the diode pump wavelength, 808 nm. The front face 63 of the vanadate crystal 54 should be coated with a coating 65 having a material that is anti-reflective (AR) at both 1064 and 532 nm.

In one preferred embodiment, a Type II KTP crystal is used as the SHG crystal 58. The crystal 58 is placed adjacent to the vanadate crystal 54 where the minimum waist size occurs. An outcoupler 60 traps the 1064 nm fundamental light and has a coating 67 of HR material at 1064 nm and a HT material at 532 nm on the concave rear surface 69 as well as a coating 71 of AR material at 532 nm on the front face 73. The green laser beam emitted from the outcoupler 60 passes through a focusing element 40 that focuses the laser beam on a first end 64 of the second optical fiber cable 34 which is mounted within the optical fiber receptacle of the optical fiber output coupling 48.

Figure 5:
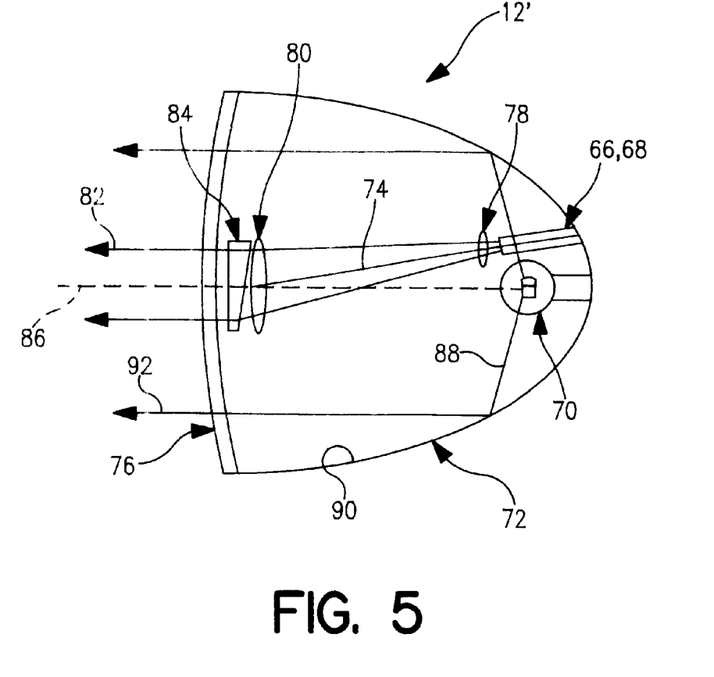
FIG. 5 is a schematic view of a first embodiment of the spotlight of FIG. 3.

With reference to FIG. 5, in a preferred embodiment; a coherent laser emitter 66, 68 and an incoherent light source 70 are incorporated into the housing 72 of the spotlight 12'. The laser light 74 is emitted from the second end 66 of the second optical fiber 34 or the distal end 68 of optical fiber cable 24 directly adjacent to the incoherent light source 70. The optical fiber 24, 34 carrying the laser light 74 is pointed towards the center of the optically transmissive cover 76. One or more axially mounted collimating lenses 78, 80 expands the laser light 74 to form a laser beam 82 and to ensure eye safety at any location after the cover 76 if desired, and fill an axially mounted prism 84 which directs the laser beam 82 through the cover 76 along the optical axis 86 of the spotlight 12'. The divergence angle of the coherent laser beam 82 is adjusted by the size of the collimating lens 80 and the distance between the end 66, 68 of the optic fiber 34, 24 and the collimating lens 80, and by the beam quality of the light 74 emerging from the fiber 34, 24.

The incoherent light source 70 may be a filament or high-intensity halogen source for example. The incoherent light 88 is partially collimated by an internal reflector 90, which can be of arbitrary shape, to form a beam 92 of incoherent light. Incoherent light 88 incident upon 30 the large collimating lens 80 and prism 84 is refracted off to the side of the beam 92, focuses, and then is dissipated by rapid divergence. Consequently, the incoherent light beam 92 which emerges from the spotlight 12' is in the form of a large annulus around the circular prism 84 and the spotlight optical axis 86. It should be appreciated that the incoherent light beam 92 emitted by the spotlight 12' is coincident with the coherent light beam 82. That is, the incoherent light beam 92 and the coherent light beam 82 are substantially coaxial.

The spotlight 12 shown in FIG. 5 is functionally the same as the spotlight found on modern police cruisers, and mounts and operates in exactly the same way except that separate switches 94, 96 are provided on the control panel 98 to operate the incoherent and coherent light sources 70, 16, respectively. A third switch 100 may also be used to operate both sources 70, 16 simultaneously.

Figure 6:
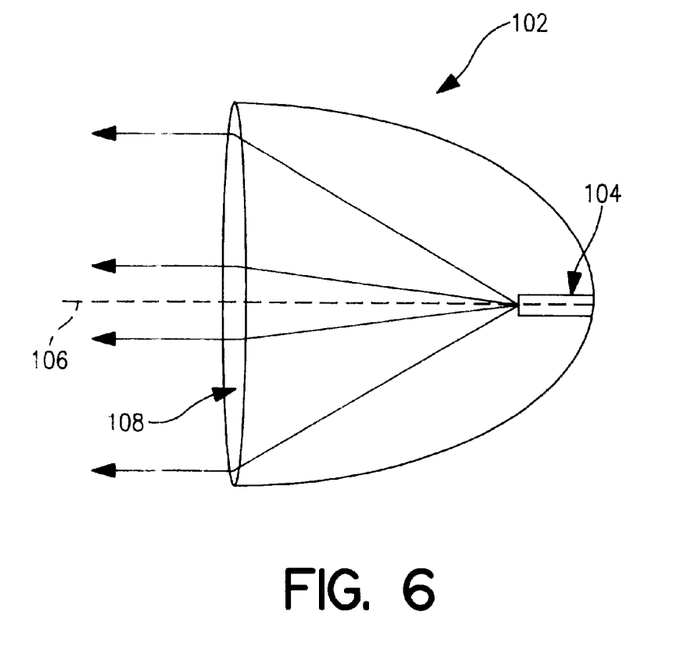
FIG. 6 is a schematic view of a second embodiment of the spotlight of FIG. 3.
Figure 7:
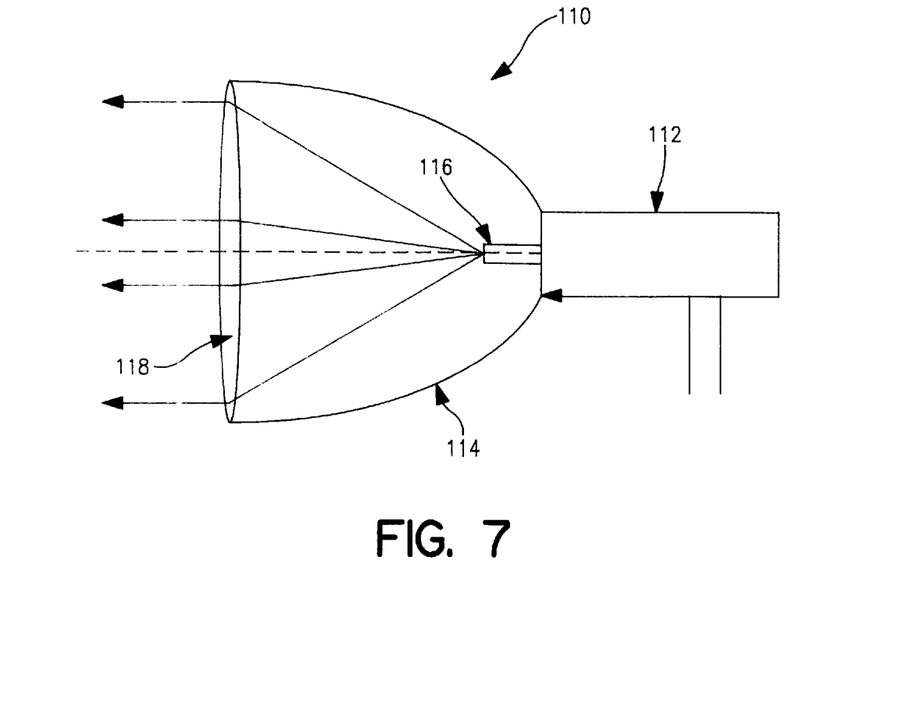
FIG. 7 is a schematic view of an alternate embodiment of the laser and spotlight of FIG. 2.

In some situations, it may be desirable to utilize a spotlight which does not have an incoherent light source. Such a spotlight 102 is shown in FIG. 6 where the fiber-laser source 104 is mounted on the optical axis 106 of the spotlight 102 and a collimating lens 108 is used to both collimate the laser light and as a cover to isolate the internal portion of the spotlight 102 from the environment. Another embodiment of the laser only spotlight 110 is shown in FIG. 7 where the laser source 112 is mounted directly on the spotlight housing 114.

Figure 9:
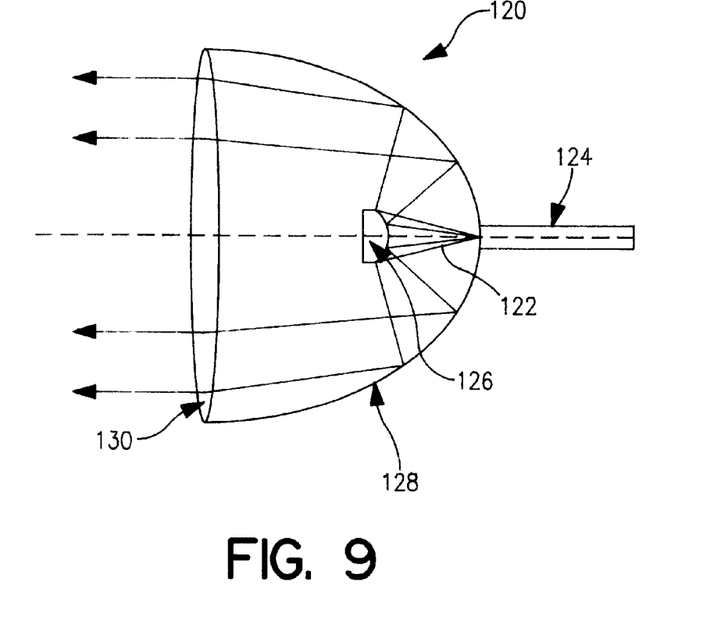
FIG. 9 is a schematic view of a third embodiment of the spotlight of FIG. 3.

A short f-number lens 116 like a gradient index (GRIN) lens or any other type of lens is used to rapidly diverge the laser beam to fill the spotlight exit aperture, which is a collimating lens 118, and to isolate the spotlight interior from the environment. Another spotlight 120, similar to that of FIG. 6, is shown in FIG. 9. The laser light 122 emerging from the optical fiber 124 is incident upon an axially mounted convex mirror 126 which directs the beam on to the main internal reflector 128 which provides partial or total collimation. The output collimating lens 130 can be used for complete collimation or in the case that collimation is achieved by the main reflector, may simply be an output window.

Figure 8:
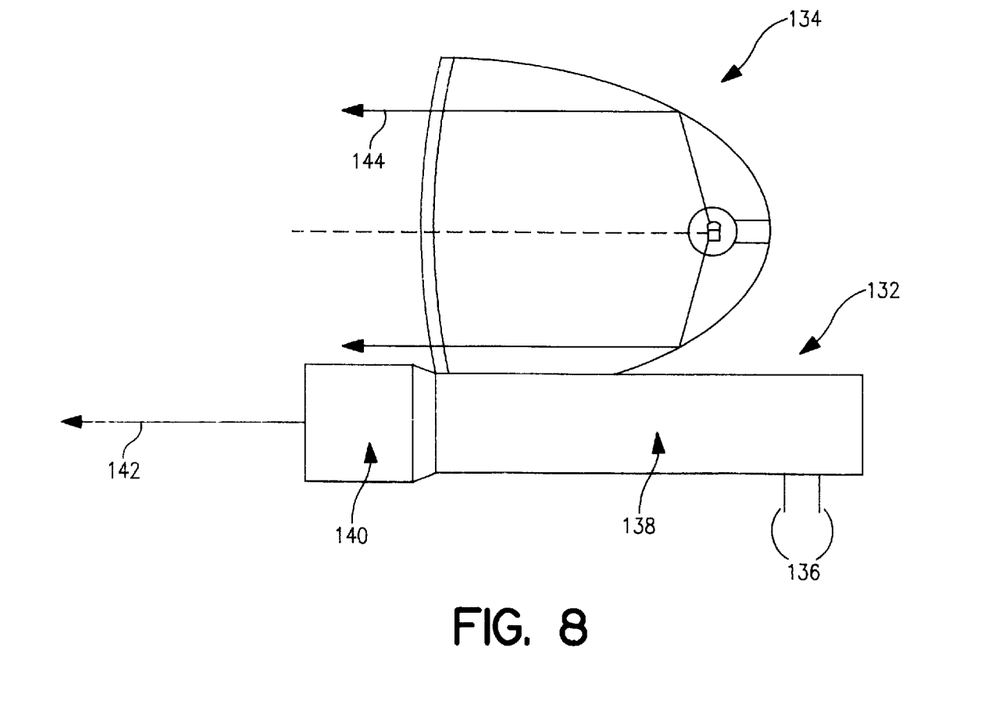
FIG. 8 is a schematic view of a third embodiment of the spotlight system of FIG. 1.

With reference to FIG. 8, a self-enclosed, flashlight-shaped laser spotlight system 132 is mounted as an outrigger to the incoherent light-only spotlight 134. Electrical power leads 136 provide electrical energy to the laser module 138. A beam expansion and collimation module 140 directs the laser beam 142 to overlap the incoherent light beam 144 at a predetermined distance from the combined spotlights 132, 134 such that the coherent and incoherent light beams 142, 144 are coincident. Alternatively, laser spotlights 102, 110, 120 of the types shown in FIGS. 6, 7 and 9 may be combined with an incoherent light-only spotlight 134 in the same manner as the apparatus of FIG. 8.

Figure 10:
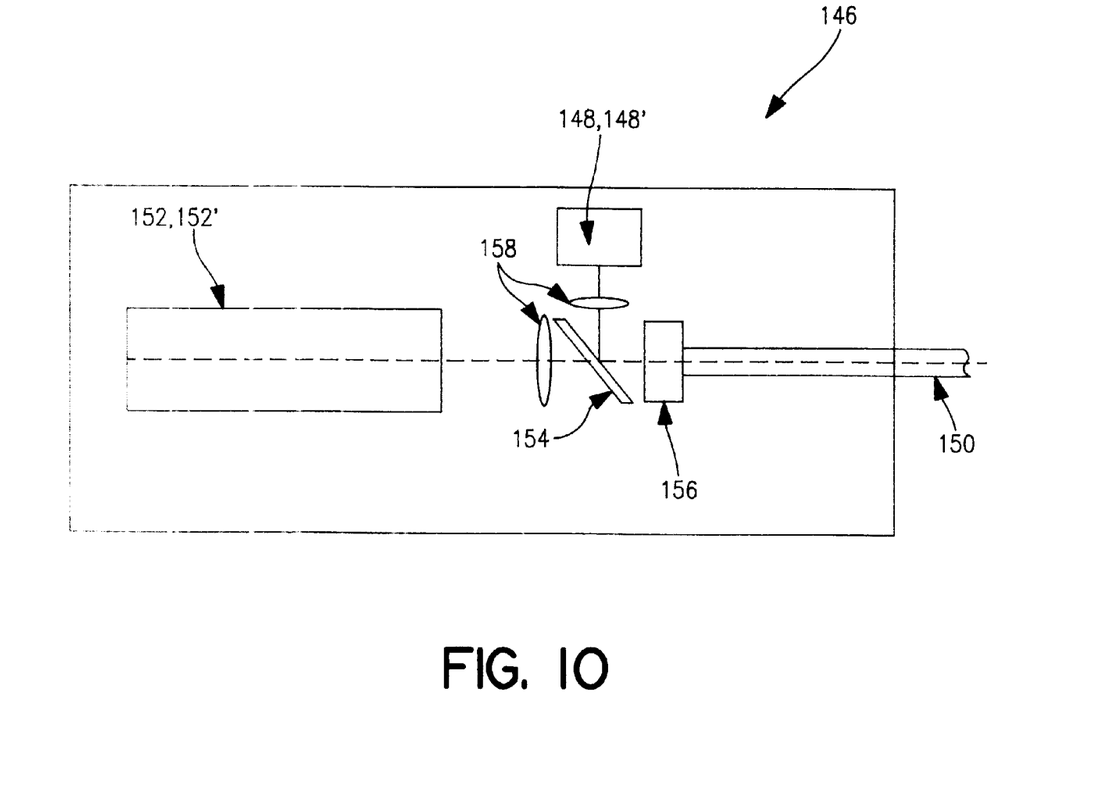
FIG. 10 is a schematic view of an alternate embodiment of the laser of FIG. 2.

One alternate embodiment of the laser of FIG. 2 is shown in FIG. 10. In this embodiment, the laser 146 comprises a laser diode source 148 operating at one wavelength is coupled to an optical fiber 150, as is a second diode laser or diode-pumped laser 152 operating at a different wavelength to provide a dual wavelength coherent source. Two lasers 148', 152' operating at one wavelength may also be used to increase the power throughput. The output of both lasers 148, 152 are polarized and the separate polarizations are arranged so that the transmission through or reflections from the polarizer 154 are as lossless as possible. A fiber bulkhead 156 anchors the fiber entrance into which the light from the two separate lasers 148, 152 are focused by a pair of lenses 158.

Figure 11:
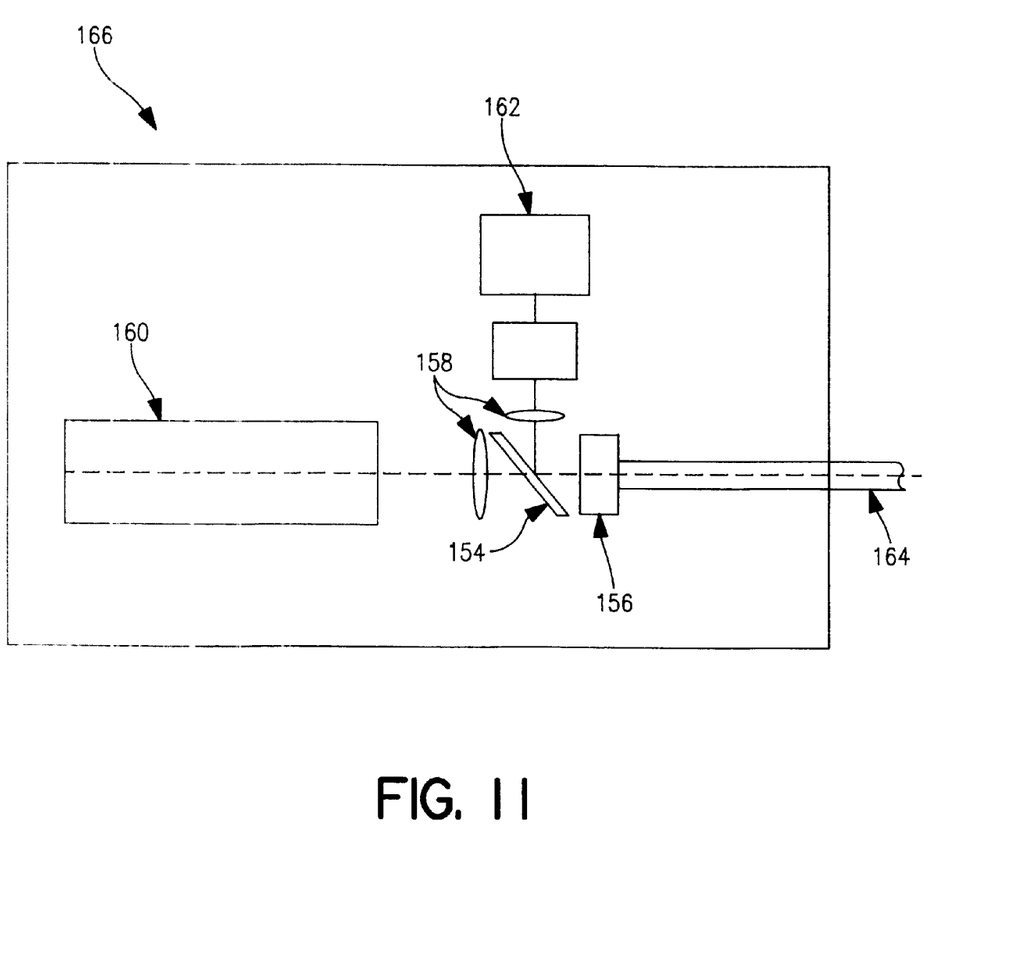
FIG. 11 is a schematic view of an alternate embodiment of the laser of FIG. 2.

A laser 160 and an incoherent light source 162 can also be combined into a single fiber 164 as shown in the laser 166 in FIG. 11 which uses a scheme very similar to that of FIG. 10. Because incoherent sources are not normally polarized, a significant loss of incoherent light would be obtained using this arrangement, nevertheless such losses can be acceptable in certain situations. Other systems that are less subject to loss as will be apparent to those trained in the art may also be used. The advantage of the arrangement of FIG. 11 is that the incoherent and coherent light sources 162, 160 are combined into a single fiber 164 which is then fed into the spotlight 102 in an arrangement like that of FIG. 6. Both sources 160, 162 can again be easily operated separately or together.

The laser spotlight system 10, 10' is controlled from a dashboard mounted control panel 98. The control panel 98 in one preferred embodiment includes a keyed interlock 168, an emission indicator 170 and selector switches 96, 94, 100 for selecting coherent light, incoherent light, or coherent and incoherent light and for selecting the mode of operation of the diode and other options.

The laser spotlight 12 is capable of performing all of the functions that ordinary spotlights do, but is significantly brighter, can operate over much longer ranges, and is capable of performing other functions as well. The output of a laser is typically a narrow beam of near monochromatic light that diverges at a known rate; the divergence of the beam, which determines the intensity at any range for a constant laser power or energy output, can be reduced by using an optical beam expander external to the laser source. In addition, lasers can be fixed single wavelength devices, tunable wavelength devices, or emit more than one discrete frequency serially or in parallel. A good example of a laser emitting at two discrete wavelengths is a device which incorporates a diode laser with a fixed wavelength between 700–1100 nm in the near infrared (IR), as well as a frequency doubled $Nd:YVO_4$, Nd:YAG, or Nd:YLF laser whose wavelength is in the vicinity of 532 nm. The diode laser can be used to illuminate nighttime scenes without detection and locate and identify individuals or vehicles in conjunction with the use of night vision or FLIR (Forward Looking Infrared Radar) systems; once located the scene can then be brightly illuminated using the bright 532 nm green laser source.

Because the laser spotlight 12 has an output whose divergence is low, it is effective over long distances. A green 532 nm laser spotlight 12 for example can be effective in locating objects at distances up to 1 km for output in the range of 100–250 mW, while ranges up to 5 km can be achieved with a 1 W green laser source. Even larger ranges can be achieved for higher power green lasers. The laser spotlight 12 is particularly effective in locating individuals hiding in brush or wooded areas because of optical augmentation, an effect that makes the eyes of humans and animals return illuminated light, allowing their location to be pinpointed. The effect is commonly seen in cats eyes which act much like corner-cube reflectors. Similarly, significant returns can be seen from the sights of guns, or from binoculars or goggles.

Eye safety is always an issue of concern when deploying lasers to be used on human subjects. Laser spotlights 12 can be demonstrated in two forms, eye-safe and non eye-safe. In the eye-safe version, the beam emerging from the laser is expanded so that its intensity is eye safe at the exit aperture. This type of device will be deployed on mobile ground vehicles such as police cruisers. The non eye-safe version whose output intensity at the exit aperture is larger than known eye safe limits, can be deployed on platforms such as helicopters whose distance from human subjects is large; through the natural divergence of the laser beam the output is in fact eye-safe by the time it strikes the ground. This type of laser requires that the helicopter maintain a certain well-determined minimum altitude when the laser is in use. Eye safe laser sources can also be used on helicopters, avoiding the need to maintain a minimum altitude.

Another aspect of the laser spotlight 12 is that it can be used to "dazzle" human subjects to evoke certain desirable effects. Threatening individuals or crowds can be held at bay by illumination with a high intensity laser. It should be obvious from the above discussion that the laser spotlight 12 has a myriad of uses involving not just law enforcement, but also prison, fire and rescue, security, border patrol, and military personnel. It may also be used for the protection of high asset targets and the protection of important individuals.

While the present invention has been described in connection with what is presently considered to be the most practical and preferred embodiments, it is understood that the invention is not limited to the disclosed embodiments. It should be appreciated that the control panel 98, laser unit 16, converter module 30, and the connecting optical fiber cables 24, 32, 34 may be easily installed in existing vehicles. The spotlight internals such as the collimating lenses 78, 80 and prism 84 will be retrofitable into the existing incandescent spotlights used throughout the law enforcement community. The coherent or incoherent light sources used in any implementation of the spotlight can be continuous wave (CW) or pulsed, and mixed formats are possible. Using a CW incoherent light source together with a pulsed laser source or vice versa can also be used. The optical fiber cable can be made quite long, 50 or 100 meters, and provision can be made to snap the spotlight off its normal mounting position so that it can be portable for hand-held use outside the vehicle.

What is claimed is:

1. A vehicle mounted laser spotlight system for emitting a light dispersion pattern into an ambient environment comprising:
   an integral laser unit having a control unit, a power supply and a laser for selectively emitting a coherent light;
   a spotlight mounted to the vehicle for receiving the coherent light from the laser unit and transmitting a beam of coherent light into the ambient environment;
   fiber optic cable means for optically coupling the laser unit and the spotlight; and
   an incoherent light transmitter for selectively transmitting a beam of incoherent light coincident with the beam of coherent light.

2. The laser spotlight system of claim 1 further comprising a control panel in electronic communication with the laser unit and the incoherent light transmitter.

3. The laser spotlight system of claim 1 wherein said laser unit further has an integral heat sink.

4. The laser spotlight system of claim 1 wherein the coherent light emitted by the laser unit defines a first laser beam having a first frequency and a first wavelength and the laser spot light further comprises a converter disposed intermediate the laser and the spotlight for receiving the first laser beam from the laser, converting the first frequency and first wavelength to a second frequency and a second wavelength, respectively, and emitting a second laser beam having the second frequency and second wavelength to the spotlight.

5. The laser spotlight system of claim 4 wherein the converter comprises a resonator and a second harmonic generating crystal to shift the first wavelength of the first laser beam to the second wavelength of the second laser beam.

6. The laser spotlight system of claim 5 wherein the first wavelength is substantially equal to 808 nm, the resonator shifts the first wavelength of the first laser beam to an intermediate wave length substantially equal to 1064 nm and the second harmonic generating crystal shifts the intermediate wave length to the second wavelength of the second laser beam, wherein the second wavelength is substantially equal to 532 nm.

7. The laser spotlight system of claim 4 wherein the second laser beam has an intensity and the spotlight includes a beam expander for dispersing the second laser beam, wherein the intensity of the dispersed second laser beam is safe for a human eye.

8. The laser spotlight system of claim 1 wherein the spotlight comprises a housing having an optically transmissive cover and defining an optical axis, the fiber optic cable means comprises a fiber optic cable having a distal end disposed in the housing, and the incoherent light transmitter is disposed in the housing.

9. The laser spotlight system of claim 8 wherein the spotlight further comprises at least one collimating lens disposed on the optical axis intermediate the cover and the second end of the fiber optic cable for receiving and expanding the coherent light and a prism disposed on the optical axis intermediate the collimating lens and the cover for forming and directing the beam of coherent light through the cover along the optical axis of the spotlight.

10. The laser spotlight system of claim 9 wherein the spotlight further comprises a reflector disposed within the housing for reflecting incoherent light transmitted by the incoherent light transmitter, at least partially collimating the incoherent light, forming the beam of incoherent light, and directing the beam of incoherent light through the cover along the optical axis of the spotlight.

11. The laser spotlight system of claim 1 wherein the spotlight comprises a housing having a collimating lens and defining an optical axis, the fiber optic cable means comprises a fiber optic cable having a distal end disposed in the housing on the optical axis, whereby the distal end of the fiber optic cable transmits the coherent light through the collimating lens along the optical axis of the spotlight to form the beam of coherent light.

12. The laser spotlight system of claim 11 wherein the spotlight further comprises a reflector disposed within the housing for reflecting the coherent light and forming the beam of coherent light and a mirror disposed on the optical axis intermediate the distal end of the fiber optic cable and the collimating lens, the mirror having a convex surface disposed adjacent the distal end of the fiber optic cable, whereby the coherent light emitted from the distal end of the fiber optic cable is directed to the reflector by the mirror.

13. The laser spotlight system of claim 1 wherein the spotlight comprises a housing having a collimating lens and defining an optical axis, the laser unit is mounted on the housing, the fiber optic cable means extending into the housing on the optical axis, whereby the distal end of the fiber optic cable transmits the coherent light through the collimating lens along the optical axis of the spotlight to form the beam of coherent light.

14. The laser spotlight system of claim 13 further comprising a short f-number lens disposed intermediate the distal end of the fiber optic cable and the collimating lens for rapidly diverging the coherent light emitted from the distal end of the fiber optic cable to fill the collimating lens.

15. The laser spotlight system of claim 1 wherein the spotlight defines a first spotlight for emitting the beam of coherent light along a first optical axis and the laser spotlight system further comprises a second spotlight for emitting the beam of incoherent light along a second optical axis, the beam of incoherent light overlapping the beam of coherent light at a predetermined distance from the first and second spotlights.

16. The laser spotlight system of claim 15 wherein the laser unit is mounted to the first spotlight and the first spotlight comprises a beam expansion and collimation module.

17. The laser spotlight system of claim 1 wherein the laser defines a first laser source emitting a first laser beam and the laser unit further comprises a second laser source emitting a second laser beam, whereby the fiber optic cable means receives the first and second laser beams from the first and second laser sources and transmits the first and second laser beams to the spotlight.

18. The laser spotlight system of claim 17 wherein the laser unit further comprises first and second lenses disposed intermediate the first and second laser sources and the fiber optic cable means for focusing the first and second laser beams and a polarizer disposed intermediate the first and second lenses and the fiber optic cable means for polarizing the first and second laser beams.

19. The laser spotlight system of claim 18 wherein the fiber optic cable means comprises a fiber bulkhead disposed within the laser unit for receiving the first and second laser beams.

20. The laser spotlight system of claim 17 wherein the first and second laser beams each have a wavelength, the wavelength of the second laser beam being different from the wavelength of the first laser beam.

21. The laser spotlight system of claim 1 wherein the laser unit further comprises the incoherent light transmitter, whereby the fiber optic cable means receives the incoherent light beam and the coherent light for transmittal to the spotlight.

22. The laser spotlight system of claim 21 wherein the laser unit further comprises first and second lenses disposed intermediate the laser and the incoherent light source and the fiber optic cable means for focusing the coherent light and the incoherent light beam and a polarizer disposed intermediate the first and second lenses and the fiber optic cable means for polarizing the coherent light and the incoherent light beam.

23. The laser spotlight system of claim 18 wherein the fiber optic cable means comprises a fiber bulkhead disposed within the laser unit for receiving the coherent light and the incoherent light beam.

24. A vehicle mounted laser spotlight system for emitting a light dispersion pattern into an ambient environment comprising:

an integral laser unit having a control unit, a power supply and a laser for selectively emitting a coherent light;

fiber optic cable means comprising at least one fiber optic cable for optically coupling the laser unit and the spotlight, the fiber optic cable having a first end disposed in the laser unit for receiving the coherent light and a distal second end for transmitting the coherent light; and a spotlight mounted to the vehicle comprising a housing defining an optical axis, an incoherent light transmitter disposed within the housing for selectively transmitting a beam of incoherent light along the optical axis, the second end of the fiber optic cable being disposed within the housing.

25. The laser spotlight system of claim 24 wherein the spotlight further comprises an optically transmissive cover disposed on the optical axis, at least one collimating lens disposed on the optical axis intermediate the cover and the second end of the fiber optic cable for receiving and expanding the coherent light, and a prism disposed on the optical axis intermediate the collimating lens and the cover for forming and directing the beam of coherent light through the cover along the optical axis of the spotlight.

26. The laser spotlight system of claim 25 wherein the spotlight further comprises a reflector disposed within the housing for reflecting incoherent light transmitted by the incoherent light transmitter, at least partially collimating the incoherent light, forming the beam of incoherent light, and directing the beam of incoherent light through the cover along the optical axis of the spotlight.

27. A spotlight for a vehicle mounted laser spotlight system comprising:

a housing defining an optical axis, the housing having an interior reflective surface and an optically transmissive cover disposed on the axis;

coherent light means for selectively transmitting a coherent light along the optical axis disposed within the housing; and incoherent light means for selectively transmitting an incoherent light along the optical axis disposed within the housing.

28. The spotlight of claim 27 wherein the coherent light means comprises fiber optic cable means having a first end connectable to a coherent light source and a second end disposed within the housing, at least one collimating lens disposed on the optical axis intermediate the cover and the second end of the fiber optic cable means for receiving and expanding the coherent light, and a prism disposed on the optical axis intermediate the collimating lens and the cover for forming and directing the beam of coherent light through the cover along the optical axis of the spotlight.

\* \* \* \* \*